United States Patent
Mason et al.

[11] 4,204,228
[45] May 20, 1980

[54] DIGITAL TESTING APPARATUS

[75] Inventors: Arthur G. Mason, Chandlers Ford; Peter R. Hutt, Petersfield, both of England

[73] Assignee: Independent Broadcasting Authority, London, England

[21] Appl. No.: 904,291

[22] Filed: May 9, 1978

[30] Foreign Application Priority Data

May 10, 1977 [GB] United Kingdom ............... 19609

[51] Int. Cl.² .................. H04N 5/00; H04N 9/62
[52] U.S. Cl. .................. 358/139; 358/147; 455/67
[58] Field of Search ............... 358/257, 139, 147; 325/42, 65, 67; 179/175, 175.3 R, 175.31 E

[56] References Cited

U.S. PATENT DOCUMENTS 4,109,100  8/1978  Unkauf ........................ 325/65 X Primary Examiner—Robert L. Richardson
Attorney, Agent, or Firm—Lawrence E. Laubscher

[57] ABSTRACT

Apparatus is disclosed for producing a test signal having a predetermined amount of distortion, including a first pulse generator (11) for producing a plurality of first pulses, a distortion pulse generator (18, 21) for producing a plurality of distortion pulses, and an adder circuit for adding the first and distortion pulses to produce a composite signal having a main portion of amplitude and shape identical to the first pulse and to which is added at least one of the distortion pulses.

41 Claims, 7 Drawing Figures

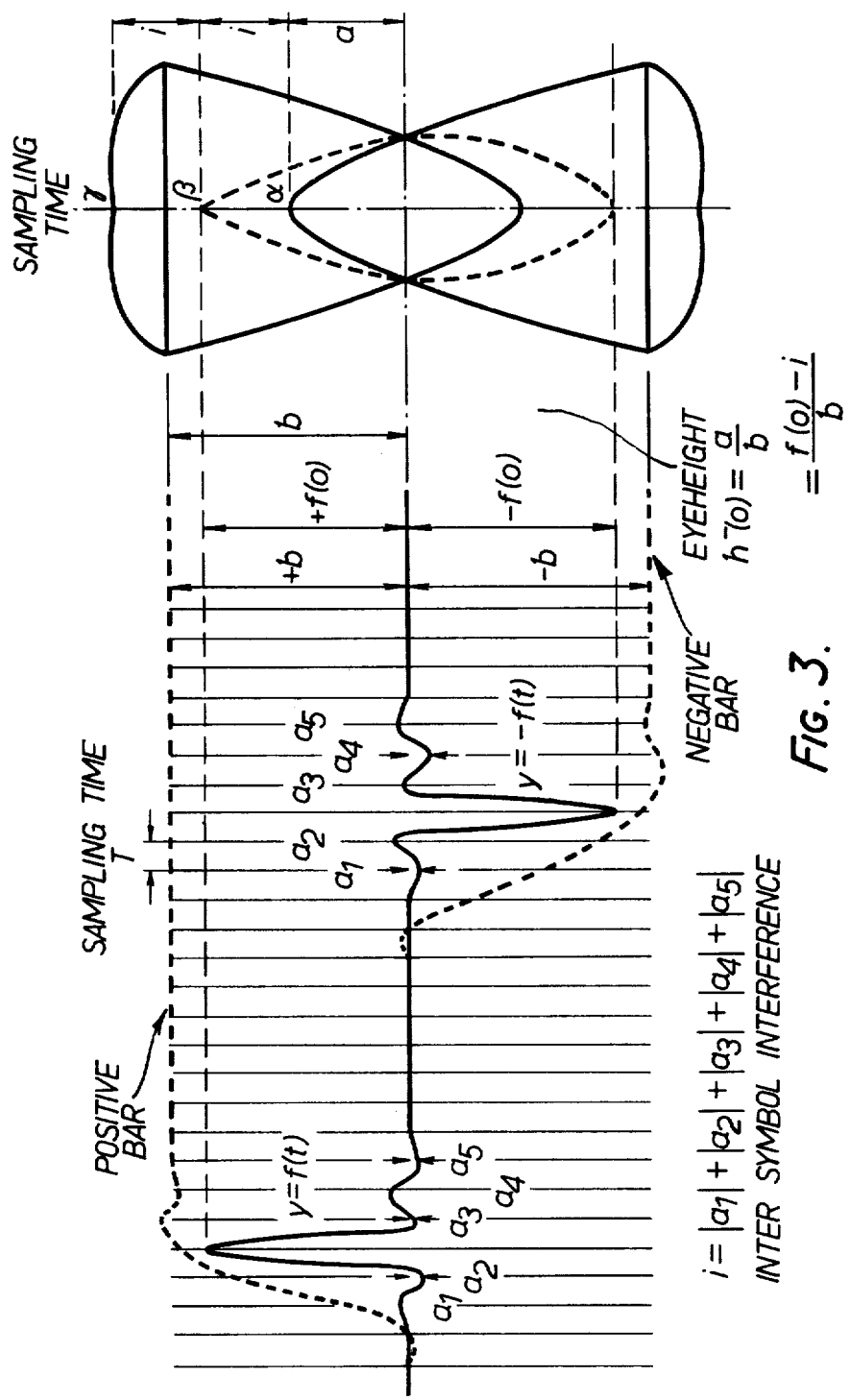

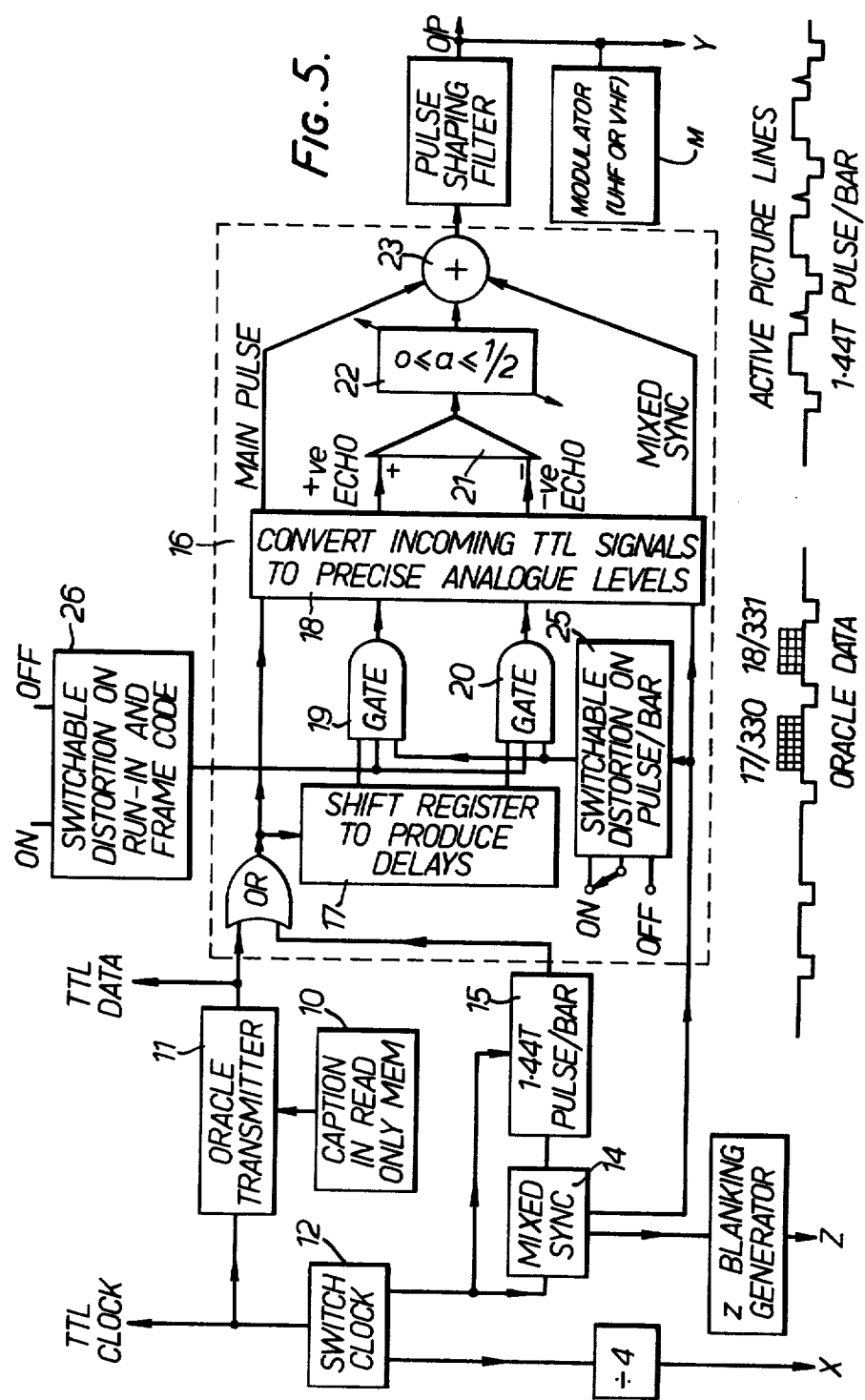

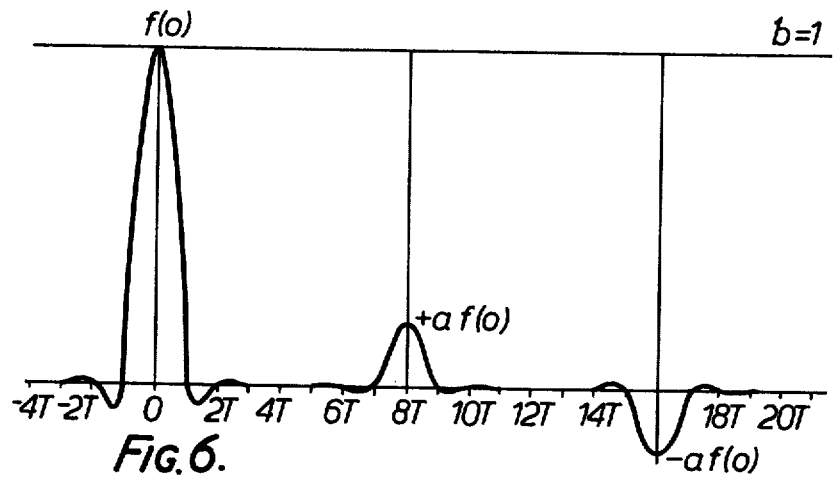
FIG. 6.
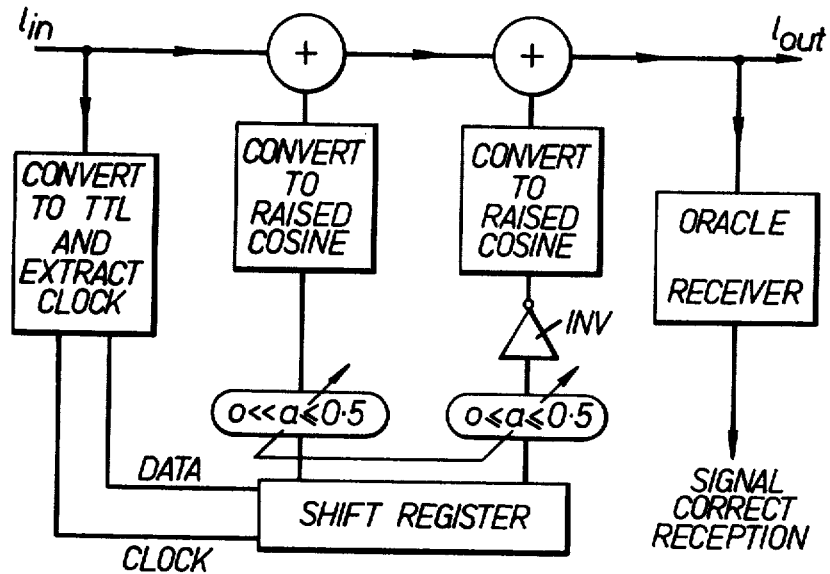
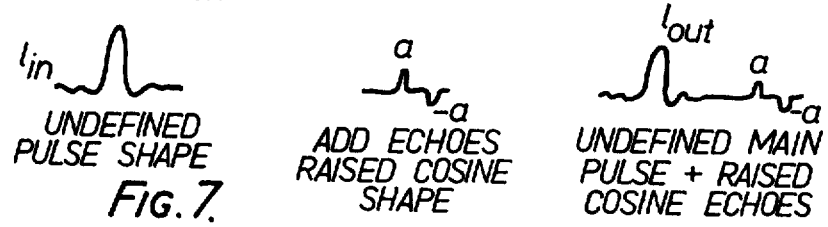
FIG. 7.

DIGITAL TESTING APPARATUS

BRIEF DESCRIPTION OF THE PRIOR ART

The present invention relates to the digital transmission and reception of information and more particularly to test apparatus therefor.

Digital transmission and reception of information is increasing in importance and particularly in television. One aspect of this is where information in digital form is transmitted during the field blanking time of a conventional video signal. This is called teletext.

The feasability of teletext transmissions has been established and decoding apparatus has been designed which is suitable for mass production. One problem, however, is that at present there is no effective test equipment for the decoding apparatus.

SUMMARY OF THE INVENTION

It is an object of the present invention to provide apparatus for testing decoding apparatus for digital signals.

The present invention provides apparatus for producing a test signal with a predetermined amount of distortion comprising means for generating or receiving a plurality of data pulses, means for generating distortion pulses of amplitude less than the data pulse, and means for producing a composite signal for each data pulse, the composite signal comprising a main portion which has an amplitude and shape identical to the data pulse to which is added at least one of the distortion pulses.

The present invention provides apparatus for generating such a test signal for digital signals having either two or many pulse signalling levels. In the case of multi-level pulse signals, the distortion pulse or set of distortion pulses is proportional in amplitude to the amplitude of the data pulse to which it is added. When the digital signal is a two level signal the amplitude of the distortion pulse or set of distortion pulses is the same for each data pulse.

The apparatus preferably also comprises means for generating data pulses of known pulse height and bar height as hereinafter defined but in one embodiment unknown data pulses may be encountered and the apparatus can then be used to determine the amount of distortion present in the unknown data pulses.

Further, the distortion pulses are preferably derived from the data pulses and therefore have the same shape as each other and as the data pulses. However, distortion pulse of a dissimilar shape to the data pulses may be generated, and the distortion pulses can be dissimilar to each other.

Although it complicates the apparatus, a single distortion pulses can be added either before or after the main portion. It is preferred therefore to add at least two distortion pulses of opposite polarity. These two pulses can be added either before or after the main portion or one can be added before and one after.

BRIEF DESCRIPTION OF THE DRAWINGS

Features and advantages of the present invention will become apparent from the following description of an embodiment thereof, given by way of example, with reference to the accompanying drawings, in which:

FIG. 3 is a diagram assisting understanding of the construction of the diagram shown in FIG. 2;

FIG. 5 is a block diagram of apparatus for producing a variable eye height;

FIG. 6 is a waveform diagram useful for understanding the operation of FIG. 5; and FIG. 7 shows a block diagram of a modification of the apparatus.

DETAILED DESCRIPTION

Teletext signals consist of a sequence of pulses which can have one of two possible levels.

One important feature of teletext decoding apparatus is its ability to function under adverse conditions. It is necessary to simulate adverse conditions in a manner that can be repeated, and maintained constant at a known level. The apparatus to be described below achieves this.

Figure 1:
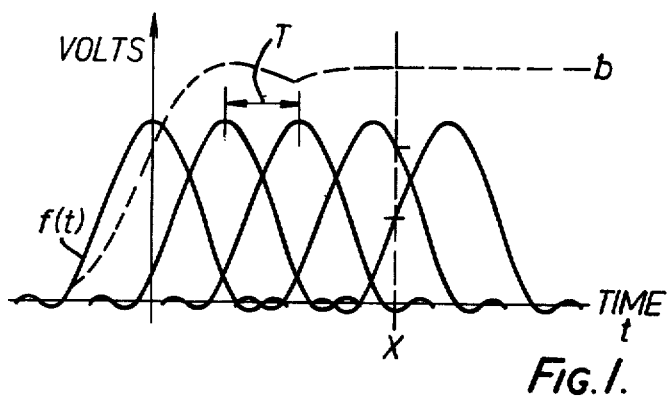
FIG. 1 is a diagram illustrating "bar height"
Figure 2:
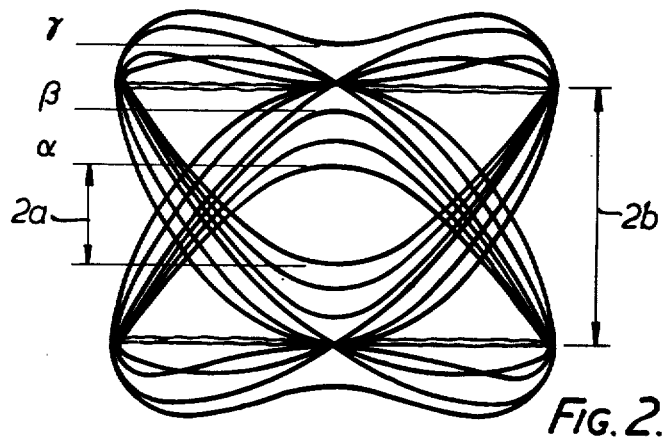
FIG. 2 is a diagram illustrating "eye height"
Figure 4:
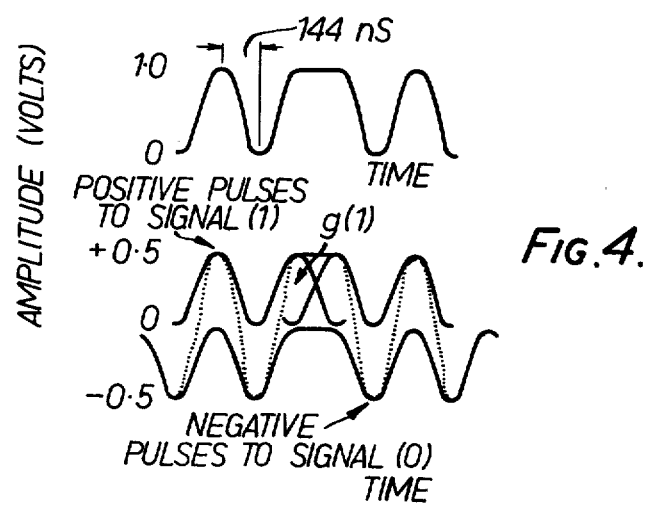
FIG. 4 is a diagram for use in understanding the diagram shown in FIG. 3.

Before describing the apparatus in detail, it will be helpful if a number of terms to be used in the description are explained. Firstly, the term "bar height" is defined as a constant level attained by reception of an infinite series of teletext pulses of the same polarity each displaced by a sampling time T. This is shown in FIG. 1. An "eye" diagram, as shown in FIG. 2 can be formed from a data stream containing a succession of teletext pulses, the "eye" being the clear area in the centre of the diagram. This is achieved by feeding the data stream to the Y trace of an oscilloscope, and feeding the data clock, in this example, divided by four and sinusoidally filtered, to the X trace. The "eye" diagram, so-called because the pattern resembles the shape of the human eye, is constructed by overlaying each data pulse at times spaced apart by the sampling or signalling interval. The important parameters of the data pulse affecting the shape of the "eye" diagram are shown in FIG. 3. Before discussing FIG. 3, it is necessary to explain positive and negative pulse signalling. To make the mathematical construction of the eye diagram easier, it is convenient to choose a negative half amplitude data pulse to represent the [0] state of the data, and a positive half amplitude data pulse to represent the [1] state of the data. This can always be one in a band-limited line system and is an alternative form of representation to representing the (1) state by a positive pulse and the (0) state by no-pulse or zero volts. The process is shown graphically in FIG. 4. When the two half amplitude pulse sequences of opposite sign are added together they can be seen to be equivalent to the positive pulse/no pulse waveform.

FIG. 3 shows a positive and negative half amplitude elemental data pulse of height f (0). The construction of the bar of height b is shown dotted. The bar is constructed from an infinite series of data pulses displaced by the sampling time T, as previously shown in FIG. 1. The "eye" diagram is the overlapping, at multiples of the sampling interval, of all the possible sequences of positive and negative pulses. the construction of the positive half of the "eye" diagram can be seen from the following.

An infinite sequence of positive pulses only, will produce a bar and hence a line across the eye diagram at height b above the centre line. An isolated positive pulse would produce the dotted trace at height $\beta$, the pulse height f (o), on the "eye" diagram. The sequence that would produce the minimum trace at height $\alpha$, would be the sequence of both positive and negative pulses such that all the negative contributions at the sampling times of the positive pulses, and all the positive contributions at the sampling times of the negative pulses, diminish the positive pulse height by amount i. In FIG. 3, the negative portions of the positive pulse which diminish the positive pulse height are $|a_2|$, $|a_3|$ and $|a_5|$. Also the positive portions of the negative pulse which diminish the positive pulse height are $|a_1|$ and $|a_4|$. The total amount by which the positive pulse is diminished is the sum of all these contributions; $|a_1|+|a_2|+|a_3|+|a_4|+|a_5|=i$. Hence the minimum trace observed at point $\alpha$ will have a height $f(6)-i$. The eyeheight is given by the ratio a/b which is $$h^-(0) = \frac{f(0) - i}{b}$$

$$= \frac{f(0) - \sum'_{k=-\infty}^{\infty} |f(kT)|}{b}$$

Where $\Sigma'$ denotes the k=0 term has been omitted from thwe summation.

By a similar reasoning, it can be seen that the positive contributions at the sampling time of the positive pulse and the negative contributions at the sampling time of the negative pulse, will augment the positive pulse height to produce a trace at $\gamma$ of total height $f(0)+i$.

The same reasoning can be applied to the negative pulse to obtain the symmetrical traces in the negative half of the "eye" diagram. Sequences, other than those mentioned above, will produce many traces between points $\alpha$ and $\gamma$ dependent on the sequence. This can be seen in the photograph of an eye pattern of actual data shown in FIG. 2. The term i is called intersymbol interference. This interference has the effect of bringing the inner edges of the eye closer together. The distance between the two edges at the central point is known as the "eyeheight" and is a measure of the amount of interference. If there is no intersymbol interference, the pulse height must be equal to the bar height and the eyeheight will be unity.

The apparatus to be described allows the eyeheight to be altered in a controlled manner and forms the basis of apparatus for testing teletext decoders.

The basis of the test apparatus is that the eye-height is degraded by introducing a positive echo pulse which does not overlap the main information carrying pulse and then a negative echo pulse which does not overlap either the main pulse or the positive echo. Both the echoes are identical in shape to the main pulse. The main pulse shape has the property that the pulse height is equal to the bar height and has zero intersymbol interference. An example of this signal is shown in FIG. 6. It is preferred, but not essential for certain pulse shapes, that the spacing between the added positive and negative echo pulses be an integer multiple of the clock period T at which the main pulses are clocked.

It can be shown that the eyeheight of the signal containing the main pulse and the two echoes is given by the following expression:

eyeheight, $$h^-(0) = \frac{f(0) - [af(0) + af(0)]}{b}$$

where f(0) is the amplitude of the main pulse;
af(0) is the amplitude of each of the added echo pulses; and
b is the bar height.

This equation reduces to $$h^-(0) = f(0)\frac{[1-2a]}{b} \qquad 2$$

However, the bar height, b, can be shown to be given by $$b = \sum_{k=-\infty}^{\infty} f(kT)$$

where
k = number of clock pulses
T = period of the clock frequency of the main pulses.
Hence $b = f(0) + af(0) - af(0)$ when the echo pulses are added $= f(0)$
∴ Substituting for b in equation 2, eyeheight is:

$$h^-(0) = 1 - 2a$$

which is a simple linear relationship with echo pulse magnitude 'a'.

Hence it can be seen that the bar height, which determines the signal reference level, is unaffected by the addition of the two distortion pulses to the main pulse. As a result of the constant bar height the distorted pulse signal has the same pulse height relative to the bar as does the distorted signal. In the case of the present apparatus, the undistorted pulse has the same height as the bar, so that in consequence the distorted pulse also has the same height as the bar. That is to say, the pulse-to-bar ratio is unaffected by the addition of the distortion pulses.

The test apparatus is shown in FIG. 5 and comprises a store 10 which contains teletext information and feeds the information to a transmitter 11 which is controlled by a clock pulse generator 12. The pulses from the generator 12, after division in frequency by four, can be fed to the x-axis of an oscilloscope as indicated by the line designated x. The generator 12 also controls the operation of a mixed sync pulse generator 14 and a further pulse generator 15, whose purpose will be explained later.

When teletext data is present, i.e. during lines 17/18 and 330/331 of the field blanking time of a conventional video signal from the store 10, each pulse of teletext data is fed to a circuit 16 for adding to it the positive and negative echo pulses. These pulses are derived from the teletext data and their amplitude is proportional to the amplitude of the teletext data pulse. The teletext data is stored as a digital signal. Therefore, in order to separate the data pulse and the echo pulses, a digital delay can be introduced by clocking the pulses through a shift register and taking outputs from the shift register at appropriate points. The necessary delay can also be achieved using analogue delay circuits or analogue delay lines. In FIG. 5, each data pulse is fed to a shift register 17 and to an amplitude control circuit 18. The data pulse is clocked through half of the shift register 17 and an output is then fed to a gate 19. The data pulse is then clocked through the remaining half of shift register 17 and a further output is fed to a gate 20.

The outputs from the gates 19 and 20 are fed to the amplitude control circuit 18 where each produces an echo pulse of precise amplitude which is independent of the amplitude of the output from the gates. Similarly, the data pulse is transformed into a data pulse of precise amplitude in the circuit 18.

The echo pulses are fed to the positive and negative inputs, respectively, of an operational amplifier 21 so that one positive echo pulse and one negative echo pulse is produced for each data pulse. The echo pulses are then fed to an attenuating circuit 22 which controls the amplitude of the echo pulses which are then added to the data pulse in an adder circuit 23 and filtered to form a pulse train as shown in FIG. 6. This pulse train is then fed to an output where it can be fed to the y-axis of the oscilloscope.

With the x-axis of the oscilloscope fed with a signal which is derived from the generator 12, the y-axis from the output of the test apparatus and the z-axis from a blanking signal derived from the mixed sync pulse generator 14, the waveform displayed by the oscilloscope will be as shown in FIG. 2. The effect of the z blanking signal on the oscilloscope is to render the display ineffective except when teletext data should be available. The sync pulses from the generator 14 are added to the signal shown in FIG. 6 prior to the signal being fed to the oscilloscope, to form a normal T.V. signal.

By adjusting the attenuation effected by the circuit 22, the eyeheight can be adjusted linearly from 1 to 0 in a controlled manner, in a stepwise manner if required and the amount of adjustment can be indicated.

The same basic apparatus can be used to degrade in a controlled and known manner, other test signals. One such test signal is shown in the bottom right of FIG. 5 and is known as a 1.44T pulse/bar signal.

This 1.44T pulse/bar signal is generated by the generator 15 during active line time of the picture and when no teletext data is being transmitted. Once more, echo pulses are added, this time to both the bar and the pulse. The echoes applied to the pulse and bar can be switched off by means of a manual switch leaving only the teletext data containing the echo. This is achieved by means of block 25 in FIG. 5.

The distortion that is applied to the data signal may be switched off during the initial parts of the data signal, particularly the synchronizing portion known as the run-in and the frame code which consist, respectively, of a 16-bit group followed by an 8-bit group of data pulses. In this way means is provided to assess the performance of data receivers in distinguishing correctly between (0) and (1) pulses in the information portion of the teletext signal, knowing that the synchronizing portion is undistorted and should therefore cause no difficulty to a receiver in achieving its essential initial data synchronization. That is to say the information-receiving portion of the receiver can be tested independently of the bit and word synchronizing portions.

A further application of the apparatus is to measure the eyeheight of an incoming signal, once more by adding positive and negative echo signals. Such apparatus is shown in FIG. 7.

An input signal having an unknown eyeheight and an undefined pulse shape can be degraded in a precise manner by the following method. The signal is fed to a receiver which converts the signal into a TTL waveform. The data waveform is delayed and positive and negative 'echoes' of the same magnitude are produced, as before. These echoes are however shaped to have a raised-cosine pulse shape and have the property that they have a magnitude a at one instant of the sampling time and are zero at all other instances of the sampling time. These echoes are then inserted back into the original data. The data now consisting of main pulses of undefined shapes followed by echoes of well-defined shape.

It can be shown that the output eyeheight is given by the following expression:

$$h^-_{out} = h^-_{in} - \frac{2a}{b}$$

which is a linear reduction in eyeheight dependent on a which is the amplitude of the echo pulses, where b is the bar height. Because both a positive and a negative echo of the same magnitude have been introduced, the level of the signal does not change.

If the receiver which is an integral part of the above equipment is known to fail at a particular eyeheight, the unknown eyeheight of the input data stream can be measured. The incoming data is simply reduced in eyeheight until the receiver fails, at this point the output eyeheight of the system is known to be X, the limit of the receiver.

The input 'eyeheight' as then $$h^-_{in} = X + \frac{2a}{b}$$

The eyeheight X could be found by first inputting data of a known 'eyeheight' H produced by apparatus similar to that shown in FIG. 3 but it is not necessary to have the facility to alter the "eyeheight". The unknown input 'eyeheight' is then given by:

$$h^-_{in} = H - \frac{2a_1}{b_1} + \frac{2a_2}{b_2}$$

wherein $b_1$ and $b_2$ are the level of each input signal and $a_1$ and $a_2$ are the magnitudes of echoes that have to be inserted for the reference input signal of eye height H and the unknown signal of eye height $h_{in}$, respectively, for failure of the receiver. If the levels $b_1$ and $b_2$ are equal and are normalized to unity, the unknown eyeheight $h^-_{in}$ becomes:

$$h^-_{in} = H - 2(a_1 - a_2)$$

The echo pulses can be added to the data pulse in positions other than those shown in FIG. 6. For example, they could both be added before the data pulse, or one could be added before and one added after the data pulse. In addition, more than two echo pulses can be added as long as the sum of the amplitudes of the positive echo pulses is equal to the sum of the amplitudes of the negative echo pulses.

The test apparatus shown in FIG. 5, is further improved by connecting a UHF or VHF modulator M to the Y output of FIG. 5. This enables the test signals, previously described, to be input via the aerial socket of a conventional television set. This addition, enables the teletext circuits, contained within a domestic television set, to be easily tested.

What we claim is:

1. Apparatus for producing a test signal having a predetermined amount of distortion, comprising
    (a) means (10, 11) for generating a plurality of first pulses;

(b) delay means (17) for deriving from said first pulses a plurality of distortion pulses having an amplitude proportional to the amplitude of the first pulses;

(c) attenuation means (22) for controlling the amplitude of the distortion pulses; and (d) adder circuit means (23) for adding the distortion pulses to the first pulses, whereby the distortion pulses are added in spaced relation to the first pulses.

2. Apparatus as defined in claim 1, wherein said delay means produces distortion pulses of opposite polarity, and further including operational amplifier means (21) connected between said delay means and said adder means, respectively, said operational amplifier means having a pair of inputs to which the distortion pulses of opposite polarity are applied, respectively, said operational amplifier means having an output terminal connected with said adder circuit means.

3. Apparatus as defined in claim 2, wherein said delay means produces distortion pulses of opposite polarity that have the same shape.

4. Apparatus as defined in claim 1, wherein said delay means produces distortion pulses of similar shape to said first pulses.

5. Apparatus as defined in claim 2, wherein the sum of all the positive distortion pulses equals the sum of all the negative distortion pulses, so that the bar height of the resulting composite pulse is not affected by the inclusion of the distortion pulses.

6. Apparatus as defined in claim 1, wherein the amplitude of the first pulse is equal to the amplitude of the bar height of the resulting composite pulse.

7. Apparatus as defined in claim 1, wherein the first pulses have a plurality of different levels, and further wherein said attenuation means produces distortion pulses the magnitude of which is proportional to the amplitude of the first pulses.

8. Apparatus as defined in claim 7, wherein the number of first pulse levels has a positive whole number other than unity.

9. Apparatus as defined in claim 7, wherein the first pulses have one of two allowable levels.

10. Apparatus as defined in claim 1, wherein said adder circuit means is operable to produce a composite signal with at least one distortion pulse prior to the first pulse.

11. Apparatus as defined in claim 1, wherein the composite signal producing means produces the composite signal with at least one distortion pulse after the first pulse.

12. Apparatus as defined in claim 1, wherein the composite signal producing means produces the composite signal with at least one distortion pulse before, and at least one distortion pulse after, the first pulse.

13. Apparatus as defined in claim 1, wherein the composite signal producing means combines a plurality of distortion pulses with the first pulse of the composite signal, whereby the distortion pulses do not overlap each other or the first pulse.

14. Apparatus as defined in claim 13, wherein the distortion pulse is added at a multiple of the interval between the first pulses.

15. Apparatus as defined in claim 1, wherein the composite signal producing means comprises means for combining the distortion pulse with the first pulse of the composite signal.

16. Apparatus as defined in claim 15, wherein the delay means is connected with a data pulse receiving means for deriving the distortion pulses from said first pulses.

17. Apparatus as defined in claim 1, wherein said delay means comprise analog delay means.

18. Apparatus as defined in claim 1, wherein said delay means comprise digital delay means.

19. Apparatus as defined in claim 1, wherein said attenuation means is operable to alter the ratio between the amplitudes of the distortion pulses and the first pulses to produce a linear relationship between the alteration of this ratio and the distortion introduced into the composite signal.

20. Apparatus as defined in claim 1, wherein said attenuation means is adjustable in a continuously variable manner.

21. Apparatus as defined in claim 1, wherein said attenuation means is adjustable in a step-wise variable manner.

22. Apparatus as defined in claim 1, wherein at least one distortion pulse is combined with the first pulses to produce a reduction in bar height, and further including compensation means for compensating for the reduction in bar height.

23. Apparatus as defined in claim 1, and further including indicating means for indicating the amount of distortion in the composite signal.

24. Apparatus as defined in claim 1, and further including means for generating scanning signals and blanking signals for facilitating an oscilloscope display of an eye diagram of the composite signal.

25. Apparatus as defined in claim 1, wherein said first pulses are teletext signals, and further including means (15) for generating a video test signal, and means (14) for producing the necessary line and field synchronization pulses to which teletext signals have been added in appropriate lines of the field blanking time.

26. Apparatus as defined in claim 25, wherein the video test signal is a teletext pulse and teletext bar signal comprising a bar of several microseconds duration followed by a single teletext pulse well separated from that bar.

27. Apparatus according to claim 25, and further including means for generating a video test signal with a predeterminable amount of distortion.

28. Apparatus as defined in claim 25, wherein the distortion applied to the video test signal has a form which is identical to the distortion applied to the first pulses.

29. Apparatus as defined in claim 25, and further including indicating means for displaying the variable amount of distortion which has been applied simultaneously to the first pulses and the video test signal.

30. Apparatus as defined in claim 25, and further including means (25) for controllably removing distortion applied simultaneously to the first pulses and the video test signal from the video test signal while leaving the distortion present on the first pulses.

31. Apparatus as defined in claim 1, and further including means (26) for controlling the production of distortion pulses so that the distortion cannot affect certain groups of first pulses.

32. Apparatus as defined in claim 30, wherein the data signal constitutes a teletext signal, and the means (26) for controlling the production of distortion pulses to remove distortion from initial portions of the teletext signals includes a 16-bit run-in group followed by an 8-bit framing-code.

33. Apparatus as defined in claim 1, and further including means operable in synchronism with a data pulse generator for providing externally accessible signals which have the same timing and similar shape to the first pulse timing waveform and the first pulse sequence waveform.

34. Apparatus according to claim 33, wherein external signals are provided at the voltage level of standard logic-level signals.

35. Apparatus as defined in claim 1, and further including modulator means (M) permitting data signals with a predetermined amount of distortion to be employed as an input, thereby providing a radio-frequency signal for the testing of data receiving equipments which require such a signal as an input.

36. Apparatus as defined in claim 1, and further including modulator means so operable that data signals interleaved with standard video signals are used to provide a source of standard modulated television radio-frequency waveform which may be used for the testing of television and data receiving equipment.

37. Apparatus according to claim 36, wherein the data signal consists of a standard teletext signal.

38. Apparatus as defined in claim 1, wherein said first pulse generating means further includes digital store means where information is stored and is read out in a cyclic manner, thereby determining the pattern of a repeating sequence of pulses.

39. Apparatus as defined in claim 38, and further including means for erasing and replacing information in said digital store.

40. Apparatus as defined in claim 38, wherein the data signal which generated from the stored digital signal is a teletext signal which is interleaved with a standard video signal.

41. Apparatus as defined in claim 38, wherein a radio-frequency signal is generated consisting of a modulated cyclically repeating data signal interleaved with a video test signal.

* * * * *